US012028642B2

(12) United States Patent
Chang et al.

(10) Patent No.: US 12,028,642 B2
(45) Date of Patent: Jul. 2, 2024

(54) TARGET TRACKING SYSTEM AND TARGET TRACKING METHOD USING THE SAME

(71) Applicant: INDUSTRIAL TECHNOLOGY RESEARCH INSTITUTE, Hsinchu (TW)

(72) Inventors: Chung-Wei Chang, Taipei (TW);
Yi-Ling Lee, Taichung (TW);
Chia-Jung Liu, Taoyuan (TW);
Yin-Ling Kuo, Hsinchu (TW);
Feng-Chi Li, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 13 days.

(21) Appl. No.: 18/089,102

(22) Filed: Dec. 27, 2022

(65) Prior Publication Data
US 2024/0187544 A1 Jun. 6, 2024

(30) Foreign Application Priority Data
Oct. 25, 2022 (TW) .................................. 111140408

(51) Int. Cl.
*G06T 7/20* (2017.01)
*A63B 69/00* (2006.01)
(Continued)

(52) U.S. Cl.
CPC .............. *H04N 5/2628* (2013.01); *G06T 7/20* (2013.01); *G06T 7/50* (2017.01); *G06T 7/70* (2017.01); *H04N 5/268* (2013.01)

(58) Field of Classification Search
CPC ........... H04N 5/2628; G06T 7/50; G06T 7/70; G06T 7/72; A63B 2225/02; A63B 2069/0008; A63B 69/40; A63B 69/002
See application file for complete search history.

(56) References Cited

U.S. PATENT DOCUMENTS 4,137,651 A    2/1979  Pardes et al.
4,619,616 A   10/1986  Clarke
(Continued)

FOREIGN PATENT DOCUMENTS

CN    102564232 A    7/2012
CN    105549603 A    5/2016
(Continued)

OTHER PUBLICATIONS

Brown et al., "Recognising Panoramas", 9th IEEE International Conference on Computer Vision (ICCV 2003), Oct. 14-17, 2003, Nice, France, Total 8 pages.
(Continued)

*Primary Examiner* — Brian P Yenke
(74) *Attorney, Agent, or Firm* — Birch, Stewart, Kolasch & Birch, LLP (57) ABSTRACT

A target tracking system includes an observation module, a dynamic tracking module, a control module and an aiming module. The observation module captures an observation frame including a tracked-object image of a tracked-object and an aiming point image and detects a distance between the observation module and the tracked-object. The dynamic tracking module analyzes the observation frame to obtain a lag correction vector between the aiming point image and the tracked-object image, and obtains a feed-forward correction vector according to the lag correction vector and the distance. The control module generates a control command representing the lag correction vector and a control command representing the feed-forward correction vector. The aiming module moves according to the control commands to control the aiming point image to align with the tracked-object image and control the aiming point image to lead the tracked-object image.

22 Claims, 8 Drawing Sheets

(51) Int. Cl.
*G06T 7/50* (2017.01)
*G06T 7/70* (2017.01)
*H04N 5/262* (2006.01)
*H04N 5/268* (2006.01)

(56) References Cited

U.S. PATENT DOCUMENTS

| | | | |
|---|---|---|---|
| 7,496,241 B1 | 2/2009 | Reneker et al. | |
| 8,543,525 B2 | 9/2013 | Distante et al. | |
| 9,056,396 B1 | 6/2015 | Linnell | |
| 9,151,573 B2 | 10/2015 | Isola et al. | |
| 9,661,257 B2 | 5/2017 | Ishikawa et al. | |
| 9,870,622 B1* | 1/2018 | Lu | G16H 50/50 |
| 10,095,942 B2 | 10/2018 | Mentese et al. | |
| 10,585,993 B2 | 3/2020 | O'Connor et al. | |
| 10,795,336 B2* | 10/2020 | Kim | G06T 7/20 |
| 11,341,604 B2 | 5/2022 | Arai | |
| 2012/0033855 A1* | 2/2012 | Ryan | G06T 7/20 |
| | | | 382/103 |
| 2017/0138710 A1 | 5/2017 | Sullivan | |
| 2018/0353822 A1* | 12/2018 | Joo | A63B 69/0002 |
| 2019/0022487 A1* | 1/2019 | Joo | A63B 60/46 |
| 2019/0201794 A1* | 7/2019 | Kang | A63B 69/00 |
| 2021/0266437 A1 | 8/2021 | Wexler et al. | |
| 2021/0383129 A1 | 12/2021 | Rosenberg | |
| 2022/0067408 A1 | 3/2022 | Sheu et al. | |
| 2023/0072172 A1* | 3/2023 | Chang | A63B 69/40 |
| 2023/0140441 A1 | 5/2023 | Koivuharju | |
| 2023/0285832 A1* | 9/2023 | Masiukiewicz | G06V 40/10 |
| 2023/0372803 A1* | 11/2023 | Kweon | G06V 20/46 |

FOREIGN PATENT DOCUMENTS

| | | |
|---|---|---|
| CN | 108401133 A | 8/2018 |
| CN | 109822692 A | 5/2019 |
| CN | 107148639 B | 7/2019 |
| CN | 110402406 A | 11/2019 |
| CN | 111256537 A | 6/2020 |
| CN | 210666449 U | 6/2020 |
| CN | 111381612 A | 7/2020 |
| CN | 112543858 A | 3/2021 |
| CN | 113439727 A | 9/2021 |
| CN | 215067868 U | 12/2021 |
| DE | 37 03 046 A1 | 8/1988 |
| DE | 40 35 023 A1 | 5/1992 |
| KR | 10-1578028 B1 | 12/2015 |
| TW | 201021187 A1 | 6/2010 |
| TW | M431003 U1 | 6/2012 |
| TW | 201331733 A1 | 8/2013 |
| TW | I490097 B | 7/2015 |
| TW | I509568 B | 11/2015 |
| TW | I553592 B | 10/2016 |
| TW | M541010 U | 5/2017 |
| TW | 201819951 A | 6/2018 |
| TW | 201902605 A | 1/2019 |
| TW | I674402 B | 10/2019 |
| TW | I685798 B | 2/2020 |
| TW | I706291 B | 10/2020 |
| TW | 202101291 A | 1/2021 |
| TW | M620697 U | 12/2021 |
| TW | 202215367 A | 4/2022 |
| TW | 202230201 A | 8/2022 |
| WO | WO 2020/061918 A1 | 4/2020 |

OTHER PUBLICATIONS

Dolasinski, "Remote Controlled Weapon Stations—Development of Thought and Technology", Problems of Mechatronics, Armament, Aviation, Safety Engineering, 2019, 11, 3 (41), pp. 87-100.

Erwin et al., "Motor Driver Program On Heavy Machine Gun Model For Remote Controlled Weapon Station (RCWS)", International Conference on ICT for Smart Society, Jun. 13-14, 2013, Total 6 pages.

Liu, "Categorization and legality of autonomous and remote weapons systems", International Review of the Red Cross, 2012, vol. 94, No. 886, pp. 627-652.

Mirdanies et al., "Object Recognition System in Remote Controlled Weapon Station Using Sift and Surf Methods", Mechatronics, Electrical Power, and Vehicular Technology 2013, vol. 04, pp. 99-108.

Telen et al., "Design Study of Gyro-stabilized, Remote-controlled Weapon Station" Mindanao Journal of Science and Technology, 2017, vol. 15, pp. 103-112.

Baskin et al., "Robust control for line-of-sight stabilization of a two-axis gimbal system," Turkish Journal of Electrical Engineering & Computer Science, 2017, pp. 3839-3853.

Mirdanies et al., "Object Recognition System in Remote Controlled Weapon Station Using Sift and Surf Methods," Mechatronics, Electrical Power, and Vehicular Technology, vol. 4, 2013, pp. 99-108.

Taiwanese Notice of Allowance and Search Report for Taiwanese Application No. 110131655, dated May 18, 2022.

Taiwanese Office Action and Search Report for Taiwanese Application No. 111140408, dated Sep. 15, 2023.

Telen et al., "Design Study of Gyro-stabilized, Remote-controlled Weapon Station," Mindanao Journal of Science and Technology, vol. 15, 2017, pp. 103-112.

U.S. Office Action for U.S. Appl. No. 17/540,877, dated Oct. 2, 2023.

* cited by examiner

TARGET TRACKING SYSTEM AND TARGET TRACKING METHOD USING THE SAME

This application claims the benefit of Taiwan application Serial No. 111140408, filed Oct. 25, 2022, the subject matter of which is incorporated herein by reference.

TECHNICAL FIELD

The disclosure relates in general to a target tracking system and a target tracking method using the same.

BACKGROUND

A projection system could project a projectile towards the tracked-object. However, when the tracked-object is in a moving state, the projectile projected by the projection system usually deviates from the tracked-object. Therefore, proposing a projection system capable of improving the aforementioned conventional deviation problem is one of the goals of the practitioners in this technical field.

SUMMARY

According to an embodiment, a target tracking method is provided. The target tracking method includes the following steps: capturing an observation frame by an observation module, wherein the observation frame comprises a tracked-object image of a tracked-object and an aiming point image; analyzing the observation frame to obtain a lag correction vector between the aiming point image and the tracked-object image by a dynamic tracking module; generating a first control command representing the lag correction vector for an aiming module by a control module; the aiming module moving according to the first control command to control the aiming point image to align with the tracked-object image; detecting a distance between the observation module and the tracked-object by the observation module; obtaining a feed-forward correction vector according to the lag correction vector and the distance by the dynamic tracking module; generating a second control command representing the feed-forward correction vector for the aiming module by the control module; and the aiming module moving according to the second control command to control the aiming point image to lead the tracked-object image.

According to another embodiment, a target tracking system is provided. The target tracking system includes an observation module, a dynamic tracking module, a control module and an aiming module. The observation module is configured to capture an observation frame, wherein the observation frame comprises a tracked-object image of a tracked-object and an aiming point image; and detect a distance between the observation module and the tracked-object. The dynamic tracking module is configured to analyze the observation frame to obtain a lag correction vector between the aiming point image and the tracked-object image; and obtain a feed-forward correction vector according to the lag correction vector and the distance. The control module is configured to generate a first control command representing the lag correction vector; and generate a second control command representing the feed-forward correction vector. The aiming module is configured to move according to the first control command to control the aiming point image to align with the tracked-object image: and move according to the second control command to control the aiming point image lead the tracked-object image.

The above and other aspects of the disclosure will become better understood with regard to the following detailed description of the preferred but non-limiting embodiment (s). The following description is made with reference to the accompanying drawings.

BRIEF DESCRIPTION OF THE DRAWINGS

FIG. 4A1 shows a schematic diagram of a real scene of the target tracking system of FIG. 1A in the search mode;

FIG. 4A2 shows a schematic diagram of the search frame captured by the target tracking system of FIG. 4A1;

FIG. 4E1 shows a schematic diagram of a horizontal rotary angle and a pitching rotary angle according to the present embodiment of the disclosure; and FIG. 4E2 shows a schematic diagram of the aiming point image leading the tracked-object image of FIG. 4D.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 1A:
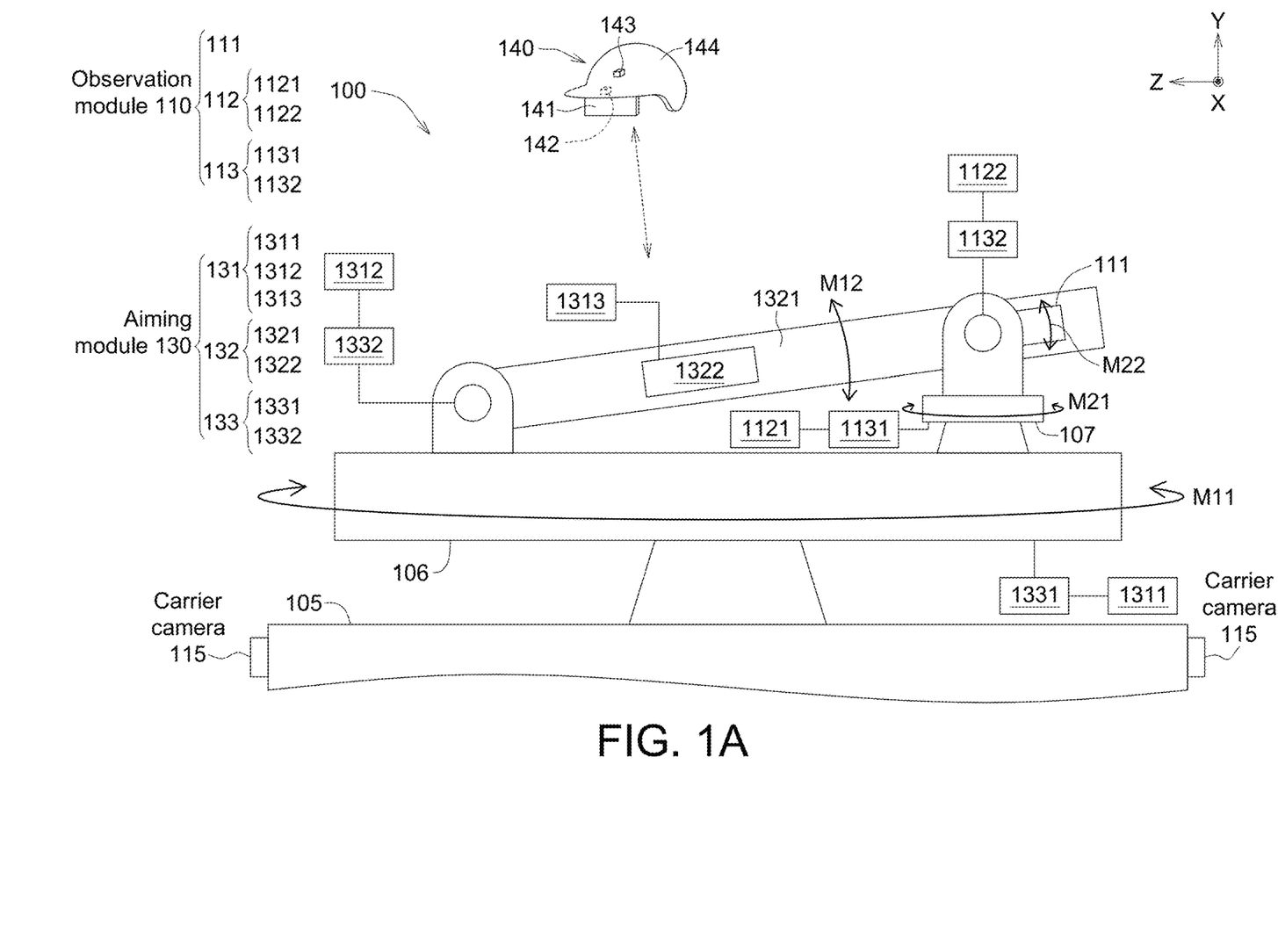
FIG. 1A shows a schematic diagram of a target tracking system according to an embodiment of the present disclosure.
Figure 1B:
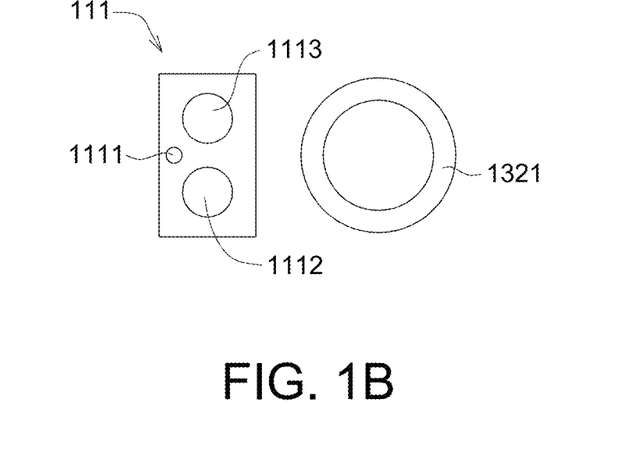
FIG. 1B shows a schematic diagram of a front view of an observation device in FIG. 1A.
Figure 1C:
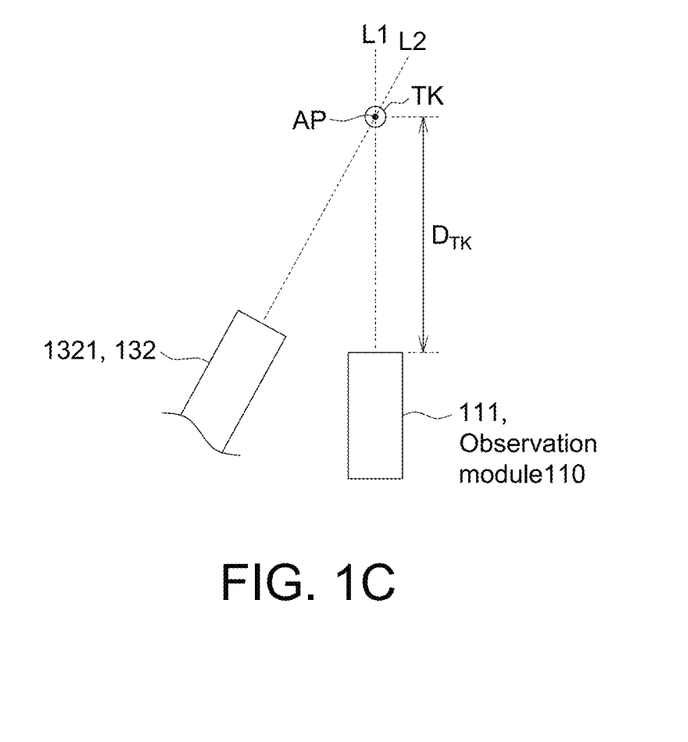
FIG. 1C shows a schematic diagram of an observation line-of-sight of the observation device and a projection line-of-sight of a projection device intersecting at an aiming point.
Figure 2:
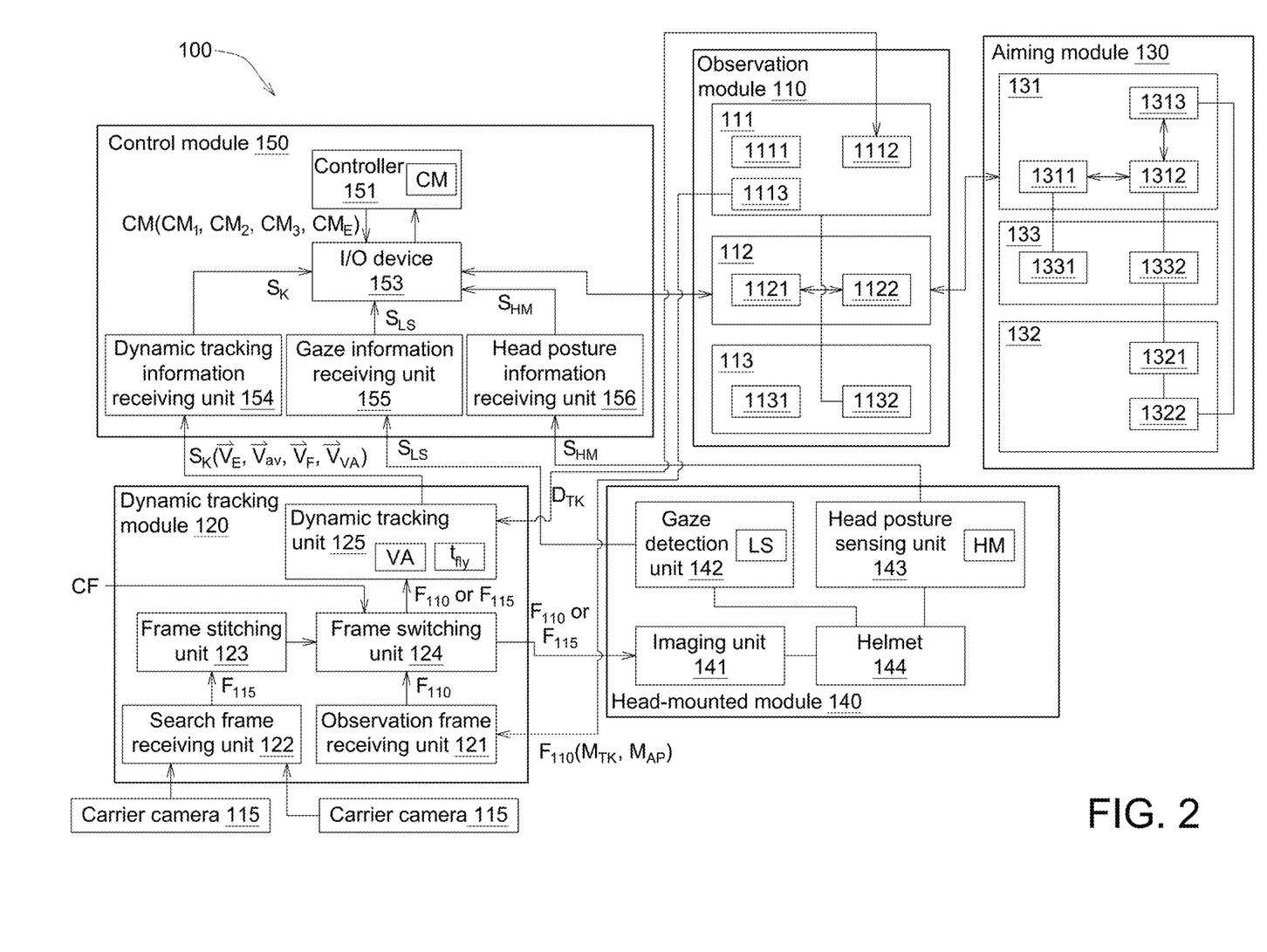
FIG. 2 is a functional block diagram of the target tracking system in FIG. 1A.

Referring to FIGS. 1A to 1C and FIG. 2, FIG. 1A shows a schematic diagram of a target tracking system 100 according to an embodiment of the present disclosure, FIG. 1B shows a schematic diagram of a front view of an observation device 111 in FIG. 1A, and FIG. 1C shows a schematic diagram of an observation line-of-sight L1 of the observation device 111 and a projection line-of-sight L2 of a projection device 132 intersecting at an aiming point AP, and FIG. 2 is a functional block diagram of the target tracking system 100 in FIG. 1A.

The target tracking system 100 is, for example, any machine capable of projecting a projectile, such as a game machine and a pitching machine. Depending on the application of the target tracking system 100, the projectile is, for example, a baseball or other various types of balls. The disclosed embodiments do not limit the application field of the target tracking system 100.

As shown in FIGS. 1A and 2, in the present embodiment, the target tracking system 100 includes a projector and a head-mounted module 140. The head-mounted module 140 could control a movement of the projector to search for a target or track a tracked-object. The projector and the head-mounted module 140 are, for example, two separated components, and they could communicate with each other through wireless communication technology. The projector may include a carrier 105, a first base 106, a second base 107, an observation module 110, at least one carrier camera 115, a dynamic tracking module 120, an aiming module 130 and a control module 150.

As shown in FIGS. 1A and 2, the carrier 105 could carry the observation module 110, the carrier camera 115, the dynamic tracking module 120, the aiming module 130, the control module 150, the first base 106 and the second base 107. In an embodiment, the carrier 105 is a movable carrier, and the observation module 110, the carrier camera 115, the dynamic tracking module 120, the aiming module 130, the control module 150 and the first base 106 could move with the carrier 105. The carrier 105 is, for example, a transportation vehicle, a transportation vehicle, etc. In another embodiment, the carrier 105 may be a stationary carrier.

As shown in FIG. 1A, the first base 106 could perform a horizontal rotary motion M11 relative to the carrier 105 (for example, rotate around the Y axis), so as to drive the components disposed thereon perform a horizontal rotary motion M11 synchronously, while the second base 107 could perform a horizontal rotary motion M21 relative to the first base 106 (for example, rotate around the Y axis), so as to drive the components disposed thereon to perform the horizontal rotary motion M21 synchronously. The second base 107 is disposed on the first base 106 to move with the first base 106. For example, the first base 106 could drive the second base 107 to perform a horizontal rotary motion M11 synchronously.

As shown in FIGS. 1A, 1B and 2, the observation module 110 includes an observation device 111, an observation driver device 112 and an observation driving mechanism device 113. The observation device 111 is disposed on the second base 107 and includes an infrared camera 1111, a laser ranging sensor 1112 and a visible light camera 1113. The relative relationship among the infrared camera 1111, the laser ranging sensor 1112 and the visible light camera 1113 is fixed. In an embodiment, the infrared camera 1111 could be configured to take pictures at night. The laser ranging sensor 1112 is configured to emit laser light to detect a distance $D_{TK}$ between the laser ranging sensor 1112 and the tracked-object TK (the tracked-object TK and the distance $D_{TK}$ are shown in FIG. 1C). The visible light camera 1113 is configured to capture an observation frame (screen, picture or image) $F_{110}$. The visible light camera 1113 is electrically connected to the dynamic tracking module 120 to transmit the captured observation frame $F_{110}$ to the dynamic tracking module 120.

As shown in FIGS. 1A and 2, the observation driving mechanism device 113 includes a first observation driving mechanism 1131 and a second observation driving mechanism 1132. The first observation driving mechanism 1131 is connected to the second base 107 to drive the second base 107 to perform the horizontal rotary motion M11, and accordingly drive the observation device 111 to perform the horizontal rotary motion M11 synchronously. The second observation driving mechanism 1132 is connected to the observation device 111 to drive the observation device 111 to perform an up-and-down pitching motion M12 (for example, rotate around the X axis). The observation driver device 112 includes a first observation driver 1121 and a second observation driver 1122. The first observation driver 1121 is electrically connected to the first observation driving mechanism 1131 to control the operation of the first observation driving mechanism 1131. The second observation driver 1122 is electrically connected to the second observation driving mechanism 1132 to control the operation of the second observation driving mechanism 1132.

A plurality of carrier cameras 115 could be disposed on the carrier 105 to capture at least one search frame $F_{115}$ of the front, the rear, the left and the right of the carrier 105. In an embodiment, the carrier cameras 115 could be disposed on several different sides of the carrier 105. The carrier camera 115 is electrically connected to the dynamic tracking module 120 to transmit the captured search frame $F_{115}$ to the dynamic tracking module 120.

As shown in FIG. 2, the dynamic tracking module 120 is electrically connected to the observation module 110, the head-mounted module 140 and the control module 150. The dynamic tracking module 120 includes an observation frame receiving unit 121, a search frame receiving unit 122, a frame stitching unit 123, a frame switching unit 124 and a dynamic tracking unit 125. At least one of the observation frame receiving unit 121, the search frame receiving unit 122, the frame stitching unit 123, the frame switching unit 124 and the dynamic tracking unit 125 could be a physical circuit formed by semiconductor process, for example.

As shown in FIG. 2, the observation frame receiving unit 121 is electrically connected to the visible light camera 1113 of the observation device 111 and configured to receive the observation frame $F_{110}$ from the visible light camera 1113. The search frame receiving unit 122 is configured to receive the search frame $F_{115}$ from the carrier camera 115. The frame stitching unit 123 could fuse or stitch the search images $F_{115}$ captured by the carrier cameras 115 into a search frame of a surrounding view (surround view image) by using appropriate image processing techniques. The frame switching unit 124 is electrically connected to the frame stitching unit 123 and the observation frame receiving unit 121 for switching between the observation frame $F_{110}$ and the search frame $F_{115}$. Furthermore, the frame switching unit 124 could transmit one of the observation frame $F_{110}$ and the search frame $F_{115}$ to the head-mounted module 140. The dynamic tracking unit 125 is configured to perform an automatic tracking mode. In the automatic tracking mode, the dynamic tracking unit 125 analyzes the observation frame $F_{110}$ to obtain a tracking signal $S_K$. The dynamic tracking unit 125 is electrically connected to the frame switching unit 124 to transmit the tracking signal $S_K$ K to the control module 150.

As shown in FIGS. 1A and 2, the aiming module 130 includes an aiming driver device 131, a projection device 132 and an aiming driving mechanism device 133. The projection device 132 includes a projection tube 1321 and a propulsion mechanism 1322. The propulsion mechanism 1322 is connected to the projection tube 1321 to load at least one projectile (not shown) into the projection tube 1321. The aiming driving mechanism device 133 includes a first aiming driving mechanism 1331 and a second aiming driving mechanism 1332. The first aiming driving mechanism 1331 is connected to the first base 106 to drive the first base 106 to perform a horizontal rotary motion M11. The second aiming driving mechanism 1332 is connected to the projection tube 1321 of the projection device 132 to drive the projection tube 1321 to perform the up-and-down pitching motion M12. The aiming driver device 131 could be disposed on the first base 106 and includes a first aiming driver 1311, a second aiming driver 1312 and a propulsion driver 1313. The first aiming driver 1311 is electrically connected to the first aiming driving mechanism 1331 to control the operation of the first aiming driving mechanism 1331. The second aiming driver 1312 is electrically connected to the second aiming driving mechanism 1332 to control the operation of the second aiming driving mechanism 1332. The propulsion driver 1313 is electrically connected to the propulsion mechanism 1322 to control the propulsion mechanism 1322 to fill the projection tube 1321 with at least one projectile.

As shown in FIG. 1C, the projection line-of-sight L2 of the projection device 132 intersects the observation line-of-sight L1 of the observation device 111 at the aiming point AP, and the aiming point AP is the aiming point of the target tracking system 100 after calibrating or correcting. In an embodiment, the projection tube 1321 of the projection device 132 could move synchronously with the observation device 111, and the intersection of the projection line-of-sight L2 and the observation line-of-sight L1 could remain at the calibrated or corrected aiming point AP.

As shown in FIGS. 1A and 2, the head-mounted module 140 includes an imaging unit 141, a gaze detection unit 142, a head posture sensing unit 143 and a helmet 144. The imaging unit 141 the gaze detection unit 142 and the head posture sensing unit 143 could be disposed on the helmet 144. The imaging unit 141 is configured to display images. The imaging unit 141 is, for example, a display or a projector. The imaging unit 141 is electrically connected to the frame switching unit 124 of the dynamic tracking module 120 to display the frame transmitted by the frame switching unit 124. The gaze detection unit 142 is configured to detect an eyeball gaze LS of the wearer of the head-mounted module 140. The gaze detection unit 142 generates an eyeball gaze signal $S_{LS}$ according to the eyeball gaze LS. Although not shown, in an embodiment, the gaze detection unit 142 includes, for example, a gaze camera and a gaze analyzer, wherein the gaze camera could capture at least one eyeball image of the wearers eyes, and the gaze analyzer could analyze the eyeball image to obtain a corresponding eyeball gaze LS by using at least one image processing technology. The gaze detection unit 142 could be disposed on the helmet 144 and disposed inwardly to capture the eyeball image of the wearer's eyes. The gaze detection unit 142 is electrically connected to the control module 150 to transmit the eyeball gaze signal $S_{LS}$ corresponding to the eyeball gaze LS to the control module 150. In addition, the gaze analyzer of the gaze detection unit 142 could, for example, be a physical circuit formed by at least one semiconductor process.

As shown in FIGS. 1A and 2, the wearer may wear the helmet 144. When the wearer's head moves, the head posture sensing unit 143 could detect a helmet motion HM of the helmet 144. In an embodiment, the helmet motion HM is, for example, a horizontal rotary motion (for example, rotates around the Y axis) and an up-and-down pitching motion (for example, rotating around the X axis), wherein the horizontal rotary motion of the head corresponds to the horizontal rotary motions M11 and M21 of the target tracking system 100 while the up-and-down pitching motions of the head correspond to the up-and-down pitching motions M12 and M22 of the target tracking system 100. The head posture sensing unit 143 could generate a helmet motion signal $S_{HM}$ corresponding to the helmet motion HM. The head posture sensing unit 143 is electrically connected to the control module 150 to transmit the helmet motion signal $S_{HM}$ to the control module 150. In an embodiment, the head posture sensing unit 143 is, for example, a gyroscope, which could sense or detect at least two degrees of freedom (DoF) of motions.

As shown in FIGS. 1A and 2, the control module 150 includes a controller 151, an I/O device 153, a dynamic tracking information receiving unit 154, a gaze information receiving unit 155 and a head posture information receiving unit 156. The I/O device 153 is electrically connected to the controller 151, the dynamic tracking information receiving unit 154, the gaze information receiving unit 155 and the head posture information receiving unit 156. The helmet motion signal $S_{HM}$, the tracking signal SK and the eyeball gaze signal $S_{LS}$ could be transmitted to the controller 151 through the I/O device 153. The controller 151 generates a control command CM by analyzing/processing the helmet motion signal $S_{HM}$, the tracking signal $S_K$ and the eyeball gaze signal $S_{LS}$. The control command CM is transmitted to the observation module 110 and the aiming module 130 through the I/O device 153, and accordingly the observation module 110 and the aiming module 130 perform the corresponding horizontal rotary motion and/or up-and-down pitching motion. In an embodiment, the observation module 110, the aiming module 130 and the control module 150 could communicate through Ethernet, for example, communicate through Ethernet Control Automation Technology (EtherCAT). Adopting the control method of Ethernet could greatly reduce the wiring, reduce the overall system volume in addition to the anti-interference effect.

As shown in FIGS. 1A and 2, the controller 151, the I/O device 153, the first observation driver 1121, the second observation driver 1122, the first aiming driver 1311, the second aiming driver 1312, and the propulsion driver 1313 could communicate through Ethernet. The controller 151, in response to the signal from the dynamic tracking module 120 and/or the signal from the head-mounted module 140, sends out a control command (for example, packet) to transmit (for example, broadcasts) to all connected drivers. When the driver receives the control command, the driver related to the control command controls the movement of the connected mechanism according to the control command, while the driver not related to the control command could ignore the control command. In addition, the above-mentioned driving mechanism includes, for example, a motor, at least one gear or gear set, a driving belt (for example, a chain, a pulley, etc.) and/or other driving elements, as long as it could drive the components connected to it to perform the horizontal rotary motion and/or the up-and-down pitching motion could be used as a component of the so-called driving mechanism in the present embodiment of the present disclosure. In addition, at least one of the controller 151, the I/O device 153, the first observation driver 1121, the second observation driver 1122, the first aiming driver 1311 the second aiming driver 1312 and the propulsion driver 1313 could be physical circuit formed by using, for example, at least one semiconductor process.

In the present embodiment, as shown in FIG. 2, the observation module 110 captures the observation frame $F_{110}$, and the observation frame $F_{110}$ includes an aiming point image $M_{AP}$ and a tracked-object image $M_{TK}$ of the tracked-object TK. The dynamic tracking module 120 analyzes the observation frame $F_{110}$ to obtain a lag correction vecto $\vec{V}_{av}$ (belonging to the aforementioned tracking signal $S_K$) between the aiming point AP and the tracked-object image $M_{TK}$. The control module 150 generates a first control command $CM_1$ (belonging to the aforementioned control command CM) representing the lag correction vecto $\vec{V}_{av}$ to the aiming module 130. The aiming module 130 moves according to the first control command $CM_1$ to control the aiming point image $M_{AP}$ to align with the tracked-object image $M_{TK}$. The observation module 110 detects the distance $D_{TK}$ between the observation module 110 and the tracked-object TK. The dynamic tracking module 120 obtains a feed-forward correction vector $\vec{V}_F$ (belonging to the tracking signal $S_K$) according to the lag correction vector $\vec{V}_{av}$ and the distance $D_{TK}$. The control module 150 generates a second control command $CM_2$ (belonging to the aforementioned control command CM) representing the feed-forward correction vector $\vec{V}_F$ to the aiming module 130. The aiming module moves according to the second control command $CM_2$ to control the aiming point image $M_{AP}$ to lead the tracked-object image $M_{TK}$. As a result, the target tracking system 100 could automatically track the tracked-object TK and analyze a motion pattern of the tracked-object TK, so as to predict a future position of the tracked-object TK, and correct the aiming point AP corresponding to the future position of the tracked-object TK in advance.

Figure 3A:
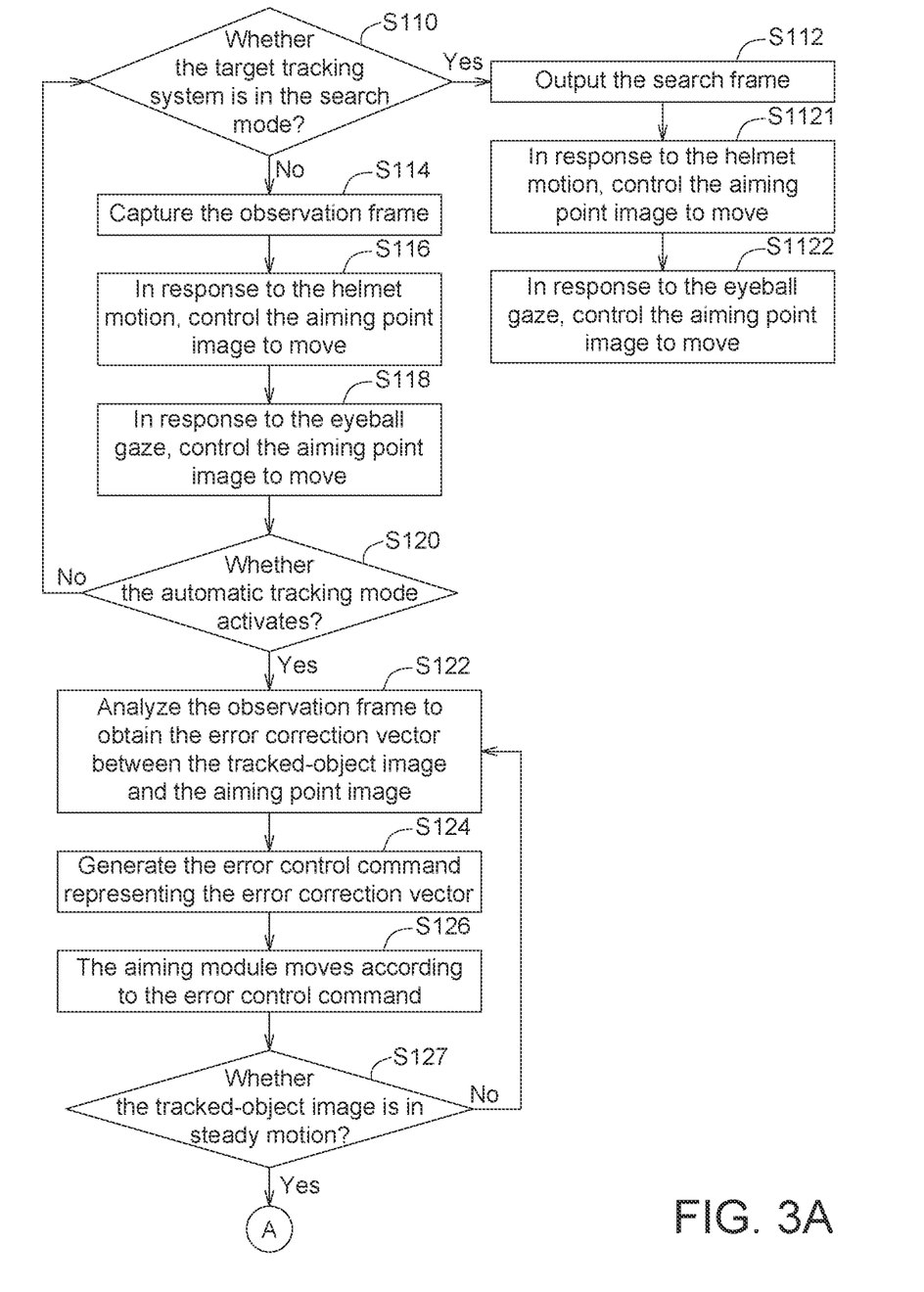
FIGS. 3A and 3B show schematic diagrams of a flow chart of a target tracking method of the target tracking system in FIG. 2.
Figure 3B:
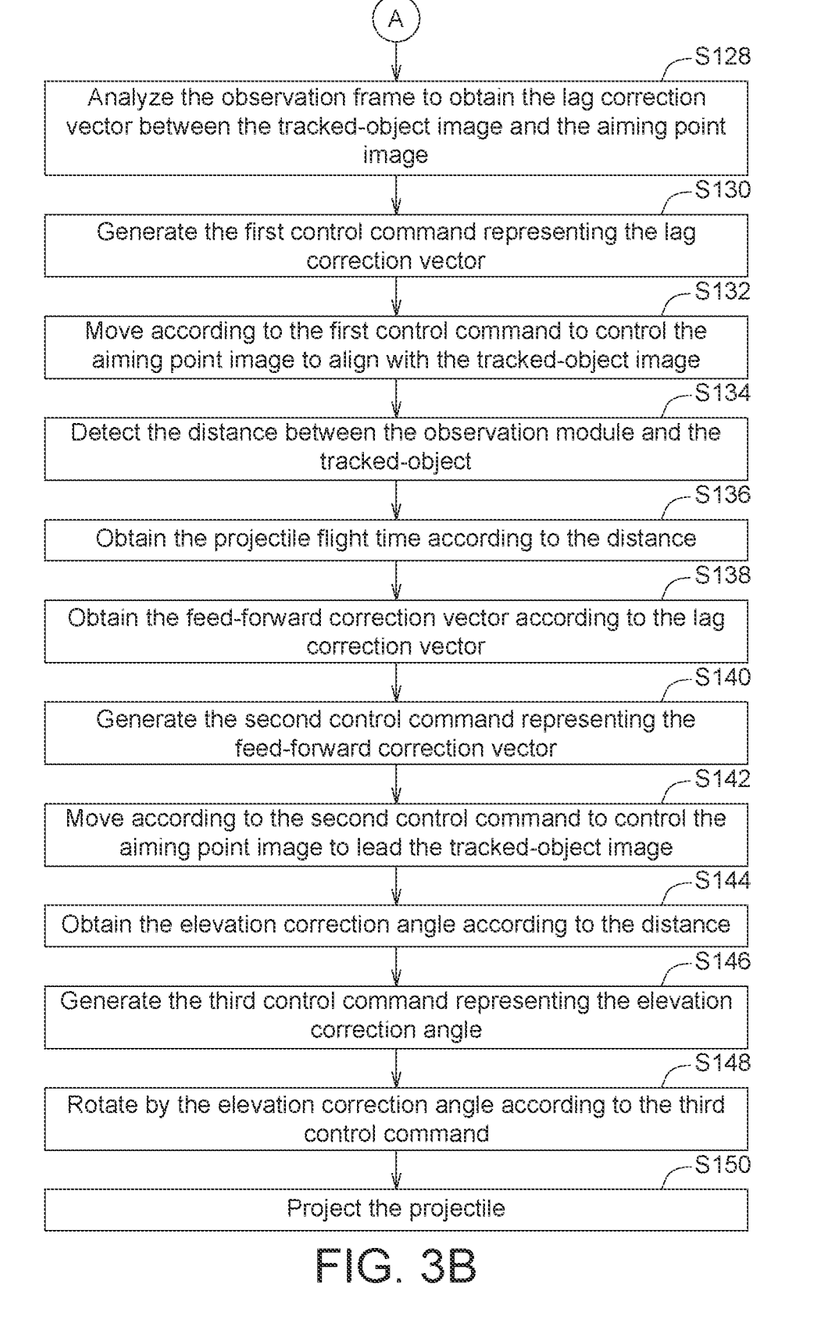

Referring to FIGS. 3A and 3B, FIGS. 3A and 3B show schematic diagrams of a flow chart of a target tracking method of the target tracking system 100 in FIG. 2.

In step S110, the controller 151 determines whether the target tracking system 100 is in the search mode. When it is in the search mode, the process proceeds to step S112; when it is not in the search mode, the process proceeds to step S114.

Figure 4A:
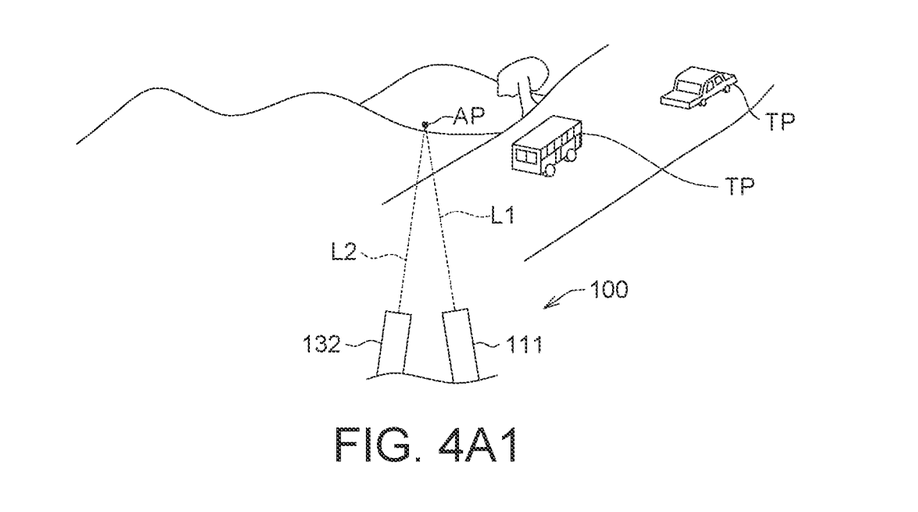
Figure 4A:
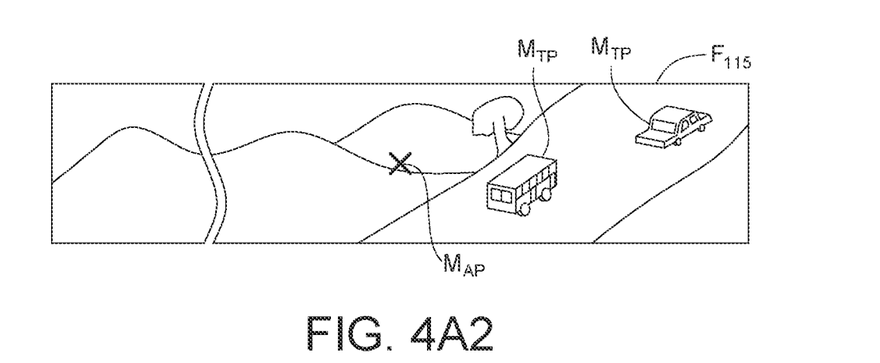

In step S112, referring to FIGS. 4A1 and 4A2, FIG. 4A1 shows a schematic diagram of a real scene of the target tracking system 100 of FIG. 1A in the search mode, and FIG. 4A2 shows a schematic diagram of the search frame $F_{115}$ captured by the target tracking system 100 of FIG. 4A1. In the search mode, the target tracking system 100 searches, for example, a 360-degree surrounding scene which may or may not contain the target object TP. In an embodiment, the dynamic tracking unit 125 could automatically search for a target object TP that matches the learned characteristics based on AI (Artificial Intelligence) big data analysis, and mark the target object TP on the search frame $F_{115}$ to facilitate the wearer to identify the target object TP. Alternatively, the wearer could search or track the desired target object TP through the search frame $F_{115}$. As described above, the target object TP could be automatically determined by the dynamic tracking unit 125 or searched by the wearer.

In the search mode, the carrier camera 115 captures the search frame $F_{115}$ of its field of view, and the search frame $F_{115}$ is transmitted to the frame switching unit 124 of the dynamic tracking module 120. The frame switching unit 124 outputs the search frame $F_{115}$ to the imaging unit 141 of the head-mounted module 140. The wearer could watch the search frame $F_{115}$ (for example, a surround view screen) presented (displayed or projected) by the imaging unit 141, and search or track the target object TP by using, for example, the helmet motion (step S1121) or the eyeball gaze (step S1122). The target tracking method of the disclosed embodiment does not limit the executing order of steps S1121 and S1122.

In terms of the helmet motion HM, in step S1121 the aiming module 130 moves in response to the helmet motion HM, so as to control the movement of the aiming point image $M_{AP}$. For example, the head of the wearer could move (for example, the horizontal rotary motion and/or the up-and-down pitching motion) to drive the helmet 144 to perform the helmet motion HM. The head posture sensing unit 143 generates the helmet motion signal $S_{HM}$ according to the helmet motion HM, and the controller 151 of the control module 150 generates the control command CM according to the helmet motion signal $S_{HM}$ to control the movement of the aiming module 130 and the observation module 110, and accordingly control the aiming point image $M_{AP}$ to move.

In terms of the eyeball gaze LS, in step S1122, the aiming module 130 moves in response to the eyeball gaze LS to control the movement of the aiming point image $M_{AP}$. For example, the wearer's eyeball gaze LS could gaze (or focus) on a position of the search frame $F_{115}$, and the gaze detection unit 142 could detect the eyeball gaze LS to generate the corresponding eyeball gaze signal $S_{LS}$. The controller 151 of the control module 150 generates the control command CM according to the eyeball gaze signal $S_{LS}$ to control the movement of the aiming module 130 and the observation module 110, and accordingly control the movement of the aiming point image $M_{AP}$.

In addition, in response to the control command CM, the aiming module 130 and the observation module 110 could move synchronously, so that the intersection point of the observation line-of-sight L1 and the projection line-of-sight L2 remains at the calibrated aiming point AP. When the aiming point AP moves, the relative position of the aiming point image $M_{AP}$ and the target object image $M_{TP}$ (or other background image(s)) in the search frame $F_{115}$ could change correspondingly. In an embodiment, the aiming point image $M_{AP}$ could be kept in a middle of the search frame $F_{115}$, but the embodiments of the present disclosure are not limited thereto.

In addition, step S112 and step S114 could be switched by the wearer. For example, the frame switching unit 124 of the dynamic tracking module 120 outputs one of the search frame $F_{115}$ and the observation frame $F_{110}$ to the head-mounted module 140. In response to the frame switching command CF (the frame switching command CF is shown in FIG. 2), the frame switching unit 124 of the dynamic tracking module 120 outputs the other (switching frame) of the search frame $F_{115}$ and the observation frame $F_{110}$ to the head-mounted module 140. Furthermore, in the search mode, the frame switching unit 124, in response to the frame switching command CF (switched to the observation mode), outputs the observation frame $F_{110}$ to the head-mounted module 140. In the observation mode, the frame switching unit 124, in response to the frame switching command CF (switched to the search mode), outputs the search frame $F_{115}$ to the head-mounted module 140. In addition, the aforementioned frame switching command CF is, for example, generated by a button (not shown) of the helmet 144, wherein the button could be triggered by the wearer.

In steps S114 to S118, the target object TP is searched or tracked in the observation mode. In the observation mode, the visible light camera 1113 of the observation module 110 captures the observation frame $F_{110}$ of its field of view, and the observation frame $F_{110}$ is transmitted to the frame switching unit 124 of the dynamic tracking module 120. The frame switching unit 124 outputs the observation frame $F_{110}$ to the imaging unit 141 of the head-mounted module 140. The wearer could watch the observation frame $F_{110}$ presented by the imaging unit 141, and search or track the target object TP by using, for example, the helmet motion (step S116) or the eyeball gaze (step S118). The target tracking method of the present embodiment does not limit the executing order of steps S116 and S118.

In terms of the helmet motion HM, in step S116, the aiming module 130 moves in response to the helmet motion HM, so as to control the movement of the aiming point image $M_{AP}$. For example, the head of the wearer could move (for example, the horizontal rotary motion and/or the up-and-down pitching motion) to drive the helmet 144 to perform the helmet motion HM. The head posture sensing unit 143 generates the helmet motion signal $S_{HM}$ according to the helmet motion HM, and the controller 151 of the control module 150 generates the control command CM to control the movement of the aiming module 130 and the observation module 110, and accordingly control the aiming point image $M_{AP}$ to move. In an embodiment, the aiming module 130 and the observation module 110 could move synchronously, so that the intersection point of the observation line-of-sight L1 and the projection line-of-sight L2 remains at the calibrated aiming point AP.

In terms of the eyeball gaze LS, in step S118, the aiming module 130, in response to the eyeball gaze LS, move to control the movement of the aiming point image $M_{AP}$. For example, the wearer's eyeball gaze LS could gaze (or focus) on a position of the observation frame $F_{110}$, and the gaze detection unit 142 detects the eyeball gaze LS to generate the corresponding eyeball gaze signal $S_{LS}$, and accordingly the controller 151 of the control module 150 generates the control command CM for controlling the movement of the aiming module 130 and the observation module 110, thereby controlling the movement of the aiming point image $M_{AP}$. In an embodiment, the aiming module 130 and the observation module 110 could move synchronously, so that the intersection point of the observation line-of-sight L1 and the projection line-of-sight L2 remains at the calibrated aiming point AP.

In step S120, the dynamic tracking unit 125 determines whether the automatic tracking mode activates. In an embodiment, in the observation frame $F_{110}$ or the search frame $F_{115}$, when the eyeball gaze LS is aligned with the target object image $M_{TP}$, the dynamic tracking unit 125 sets the target object image $M_{TP}$ as the tracked-object image $M_{TK}$ (that is, the corresponding target object TP is set as the tracked-object TK). In an embodiment, when the eyeball gaze LS stays at the target object image $M_{TP}$ for a period of time, the dynamic tracking unit 125 sets the target object image $M_{TP}$ as the tracked-object image $M_{TK}$. The aforementioned "a period of time" is, for example, plural seconds. When the tracked-object image $M_{TK}$ exists, the frame switching unit 124 outputs the observation frame $F_{110}$ to the head-mounted module 140 and the process proceeds to step S122, and the dynamic tracking unit 125 activates the automatic tracking mode. In another embodiment, in the observation frame $F_{110}$ or the detection frame $F_{115}$, when the number of the target object image MTP is one or the first target object image $M_{TP}$ appears, the dynamic tracking unit 125 sets the target object image $M_{TP}$ as the tracked-object image $M_{TK}$, the frame switching unit 124 outputs the observation frame $F_{110}$ to the head-mounted module 140 and the process proceeds to step S122, and the dynamic tracking unit 125 activates the automatic tracking mode.

In steps S122 to S126, in the observation frame $F_{110}$, the dynamic tracking unit 125 continues to track the tracked-object image $M_{TK}$, so as to shorten or maintain the distance between the aiming point image $M_{AP}$ and the tracked-object image $M_{TK}$.

Figure 4B:
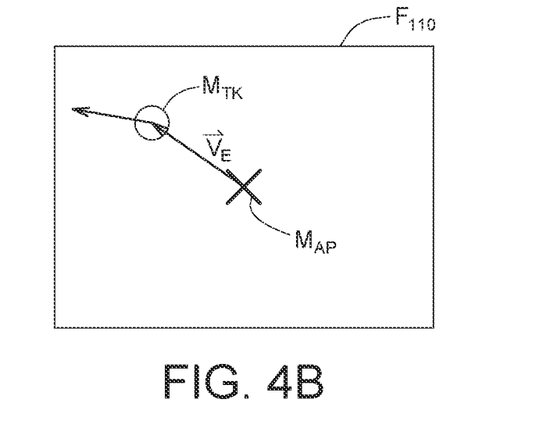
FIG. 4B shows a schematic diagram of an error correction vector by which the aiming point image of FIG. 4A2 lags behind the tracked-object image.

In step S122, referring to FIG. 2 and FIG. 4B, FIG. 4B shows a schematic diagram of an error correction vector $\vec{V}_E$ by which the aiming point image $M_{AP}$ of FIG. 4A2 lags behind the tracked-object image $M_{TK}$. The dynamic tracking unit 125 analyzes the observation frame $F_{110}$ to obtain the error correction vector $\vec{V}_E$ (belonging to the tracking signal SK) between the tracked-object image $M_{TK}$ and the aiming point image $M_{AP}$, and transmit the error correction vector $\vec{V}_E$ to the control module 150.

In step S124, as shown in FIGS. 2 and 4B, the control module 150 generates an error control command $CM_E$ (belonging to the control command CM) representing the error correction vector $\vec{V}_E$ to the aiming module 130.

In step S126, as shown in FIGS. 2 and 4B, the aiming module 130 moves according to the error control command $CM_E$ to shorten or maintain the distance between the aiming point image $M_{AP}$ and the tracked-object image $M_{TK}$. As a result, the tracked-object image $M_{TK}$ could be kept in the observation frame $F_{110}$ (does not lose the tracked-object TK). In an embodiment, the control module 150 could transmit the error control command $CM_E$ to the observation module 110 and the aiming module 130 at the same time, and the aiming module 130 and the observation module 110 move synchronously so that the intersection of the observation line-of-sight L1 and the projection line-of-sight L2 stay at the calibrated aiming point AP, as shown in FIG. 1C.

As stated above, the dynamic tracking unit 125 analyzes the observation frame $F_{110}$ to obtain the error correction vector $\vec{V}_E$ between the tracked-object image $M_{TK}$ and the aiming point image $M_{AP}$, and the aiming module 130 and the observation module 110 move according to the error correction vector $\vec{V}_E$ to shorten or maintain the distance between the aiming point AP and the tracked-object TK to make the tracked-object image $M_{TK}$ keep in the observation frame $F_{110}$ (does not lose the tracked-object TK). In another embodiment, when the tracked-object image $M_{TK}$ leaves the observation frame $F_{110}$ (lose the tracked-object T), the dynamic tracking module 120 could switch the frame to the search frame $F_{115}$ and output the search frame $F_{115}$ to the head-mounted module 140. As a result, it is helpful for the wearer quickly search the tracked-object image $M_{TK}$ in the search frame $F_{115}$ through a wider viewing angle (for example, a surround view screen).

In step S127, in the observation frame $F_{110}$, the dynamic tracking unit 125 determines whether the tracked-object image $M_{TK}$ is in steady motion. When the tracked-object image $M_{TK}$ steadily moves, the dynamic tracking unit 125 activates a projection preparation mode (steps S128 to S148). When the tracked-object image $M_{TK}$ is in an unsteady motion, the process returns to step S122. The above-mentioned "steady motion" is, for example, the tracked-object image $M_{TK}$ moving at a constant speed or constant rate, while "unsteady motion" is, for example, the moving speed of the tracked-object image $M_{TK}$ changes with time, for example, the moving speed increases, decreases, and/or the direction of motion changes with time. In the projection preparation mode, the former stage (steps S128 to S132) is a lag correction vector compensation procedure, and the latter stage (steps S134 to S142) is a feed-forward correction vector compensation procedure. After the projection preparation mode is completed, the process proceeds to the projection operation in step S150.

The dynamic tracking unit 125 could determine whether the tracked-object image $M_{TK}$ moves stably according to the first n observation frames $F_{110}$, wherein n is, for example, a positive integer equal to or greater than 3. A time interval (sampling time) $\Delta t$ of every two observation frames $F_{110}$ depends on a sampling frequency, wherein the sampling frequency ranges between, for example, between 10 Hz and 20 Hz. The dynamic tracking unit 125 could analyze a position difference of the tracked-object image $M_{TK}$ in two adjacent observation frames $F_{110}$, and obtain a moving speed of the tracked-object image $M_{TK}$ by using the time interval $\Delta t$. In the first n observation frames $F_{110}$, when the moving speeds of the tracked-object image $M_{TK}$ at different sampling time points are approximately equal, or when the difference of plural moving speeds are within an allowable error, the dynamic tracking unit 125 determines the tracked-object image $M_{TK}$ is in steady motion, and the process proceeds to step S128. When the difference of plural moving speeds of the tracked-object image $M_{TK}$ at different sampling time points are outside the allowable error, it means that the tracked-object image $M_{TK}$ is in an unsteady motion, and the process returns to step S122.

Figure 4C:
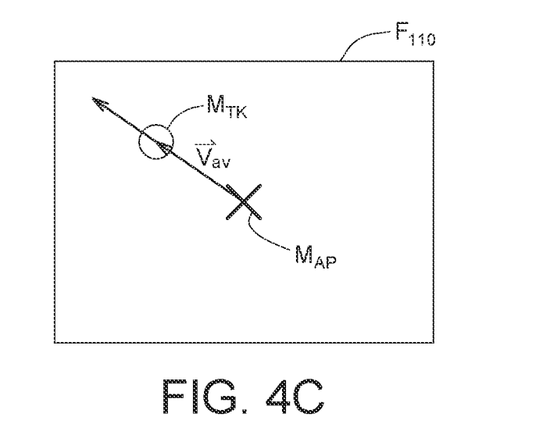
FIG. 4C shows a schematic diagram of the tracked-object image of FIG. 4A2 performing a steady motion.

The lag correction vector compensation procedure (steps S128 to S132) is illustrated below with reference to FIGS. 4C and 4D. FIG. 4C shows a schematic diagram of the tracked-object image $M_{TK}$ of FIG. 4A2 performing a steady motion, and FIG. 4D shows a schematic diagram of the aiming point image $M_{AP}$ of FIG. 4C aligning with the tracked-object image $M_{TK}$.

In step S128, as shown in FIGS. 2 and 4C, the dynamic tracking unit 125 analyzes the observation frame $F_{110}$ to obtain the lag correction vector $\vec{V}_{av}$ (belonging to the tracking signal $S_K$) between the tracked-object image $M_{TK}$ and the aiming point image $M_{AP}$, and transmit the lag correction vector $\vec{V}_{av}$ to the control module 150.

In step S130, as shown in FIGS. 2 and 4C, the control module 150 generates the first control command $CM_1$ representing the lag correction vector $\vec{V}_{av}$ (the first control command $CM_1$ is shown in FIG. 2) to the aiming module 130.

Figure 4D:
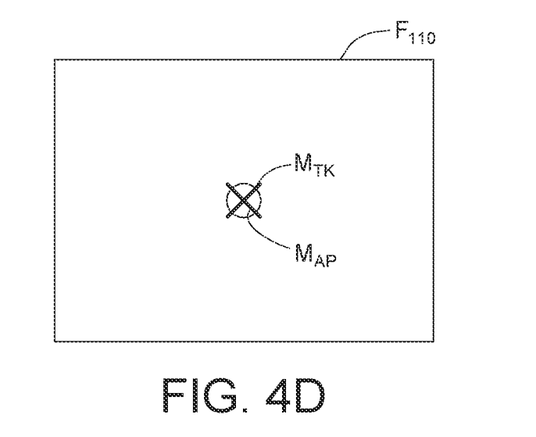
FIG. 4D shows a schematic diagram of the aiming point image of FIG. 4C aligning with the tracked-object image.

In step S132, as shown in FIGS. 2 and 4D, the aiming module 130 moves according to the first control command $CM_1$ to control the aiming point image $M_{AP}$ to align with the tracked-object image $M_{TK}$. In an embodiment, the control module 150 could transmit the first control command $CM_1$ to the observation module 110 and the aiming module 130 at the same time, and the aiming module 130 and the observation module 110 move synchronously, so that the intersection of the observation line-of-sight L1 and the projection line-of-sight L2 stay at the calibrated aiming point AP.

Figure 4E:
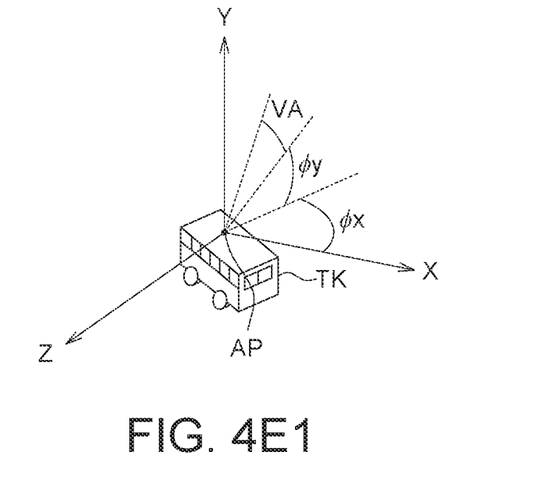
Figure 4E:
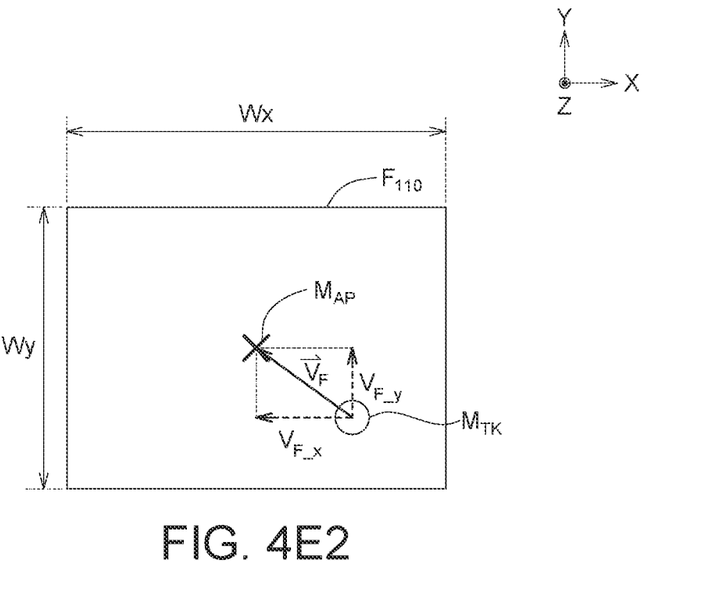

The feed-forward correction vector compensation procedure (steps S134 to S142) is illustrated below with reference to FIGS. 4E1 and 4E2. FIG. 4E1 shows a schematic diagram of a horizontal rotary angle $Ø_x$ and a pitching rotary angle $Ø_y$ according to the present embodiment of the disclosure, and FIG. 4E2 shows a schematic diagram of the aiming point image $M_{AP}$ leading the tracked-object image $M_{TK}$ of FIG. 4D.

In step S134, as shown in FIGS. 1C and 2, the laser ranging sensor 1112 of the observation module 110 detects the distance $D_{TK}$ between the observation module 110 and the tracked-object TK.

In step S136, the dynamic tracking module 120 obtains a projectile flight time $t_{fly}$ according to the distance $D_{TK}$. For example, the dynamic tracking unit 125 obtains the projectile flight time $t_{fly}$ corresponding to the distance $D_{TK}$ according to the corresponding relationship between the distance $D_{TK}$ and the projectile flight time $t_{fly}$. The aforementioned corresponding relationship is, for example, a table, as shown in Table 1 below. In another embodiment, the corresponding relationship may also be a curve, an equation, etc.

TABLE 1

| distance $D_{TK}$ (meter) | elevation correction angle VA (angle) | projectile flight time $t_{fly}$ (second) |
| --- | --- | --- |
| 200 | 1.32 | 0.22 |
| 400 | 2.81 | 0.46 |
| 600 | 4.42 | 0.72 |
| 800 | 6.86 | 1.04 |
| 1000 | 8.31 | 1.38 |
| 1200 | 10.75 | 1.72 |

In step S138, as shown in FIGS. 2 and 4E2, the dynamic tracking module 120 obtains the feed-forward correction vector $\vec{V}_F$ according to the lag correction vector $\vec{V}_{av}$ and the projectile flight time $t_{fly}$. The dynamic tracking module 120 could obtain the feed-forward correction vector $\vec{V}_F$ by using, for example, the following equations (1) and (2). In equations (1) and (2), $V_{F\_x}$ is a horizontal correction amount (the number of pixels) of the feed-forward correction vector $\vec{V}_F$ in a horizontal rotary direction (for example, in the X axis), and $V_{F\_y}$ is a pitching correction amount (the number of pixels) in an up-and-down pitching direction (for example, in the Y axis). The lag correction vector $\vec{V}_{av}$ could be expressed as $\vec{V}_{av}=v_{av\_x}\vec{i}+v_{av\_y}\vec{j}$, wherein $v_{av\_x}$ is a component of the lag correction vector $\vec{V}_{av}$ in the horizontal rotary direction, $v_{av\_y}$ is a component of the lag correction vector $\vec{V}_{av}$ in the up-and-down pitching direction, $t_{fly}$ is the projectile flight time and $\Delta t$ is the sampling time. The feed-forward correction vector $\vec{V}_F$ could be expressed as $\vec{V}_F=V_{F\_x}\vec{i}+V_{F\_y}\vec{j}$.

$$V_{F\_x} = v_{av\_x} \times \frac{t_{fly}}{\Delta t} \quad (1)$$

$$V_{F\_y} = v_{av\_y} \times \frac{t_{fly}}{\Delta t} \quad (2)$$

In step S140, as shown in FIGS. 2 and 4E2, the control module 150 generates a second control command $CM_2$ representing the feed-forward correction vector $\vec{V}_F$ to the aiming module 130.

In step S142, as shown in FIGS. 2 and 4E2, the aiming module 130 moves according to the second control command $CM_2$ (belonging to the control command CM), so as to control the aiming point image $M_{AP}$ to lead the tracked-object image $M_{TK}$. In this step, the aiming point image $M_{AP}$ leads the tracked-object image $M_{TK}$ according to the feed-forward correction vector $\vec{V}_F$. In an embodiment, the control module 150 could simultaneously transmit the second control command $CM_2$ to the observation module 110 and the aiming module 130, and the aiming module 130 and the observation module 110 could move synchronously, so that the intersection of the observation line-of-sight L1 and the projection line-of-sight L2 stay at the calibrated aiming point AP.

In an embodiment, the horizontal rotary angle and the pitching rotary angle of the aiming point AP could be obtained by using the horizontal correction amount $V_{F\_x}$ and the pitching correction amount $V_{F\_y}$. For example, the horizontal rotary angle $Ø_x$ and the pitching rotary angle $Ø_y$ could be obtained according to the following equations (3) and (4). The horizontal rotary angle $Ø_x$ is, for example, a rotary angle around the Y axis, and the pitching rotary angle $Ø_y$ is, for example, a rotary angle around the X axis. In equations (3) and (4), $Ø_x$ is the horizontal rotary angle of the aiming point AP, $Ø_y$ is the pitching rotary angle of the aiming point AP, and $W_x$ is a horizontal (for example, in the X-axis) field-of-view pixel amount of the observation frame $F_{110}$, $W_y$ is a vertical (for example, along the Y axis) field-of-view pixel amount of the observation frame $F_{110}$, $FOV_x$ is a horizontal observation angle (degrees) corresponding to the horizontal field-of-view pixel amount $W_x$ of the observation frame $F_{110}$, and $FOV_y$ is a vertical observation angle (degrees) corresponding to the vertical field-of-view pixel amount $W_y$ of the observation frame $F_{110}$. A ratio of the horizontal observation angle $FOV_x$ to the vertical observation angle $FOV_y$ is equal to a ratio of the horizontal field-of-view pixel amount $W_x$ to the vertical field-of-view pixel amount $W_y$. The second control command $CM_2$ is a command corresponding to or representing the horizontal rotary angle $Ø_x$ and the pitching rotary angle $Ø_y$. In addition, the first control command $CM_1$ and the error control command $CM_E$ herein are, for example, commands corresponding to or representing the horizontal rotary angle and/or the pitching rotary angle, which could be obtained using the same or similar manner, and the similarities will not be repeated here. To sum up, the error control command $CM_E$, the first control command $CM_1$ and the second control command $CM_2$ are obtained by the control module 150 in the following manner: (1). analyze an image vector of the observation frame $F_{110}$; (2). obtain an angle value corresponding to an image vector; (3). convert the angle value to the control command.

$$Ø_x = FOV_x \times \frac{V_{F\_x}}{W_x} \quad (3)$$

$$Ø_y = FOV_y \times \frac{V_{F\_y}}{W_y} \quad (4)$$

In case of the horizontal field-of-view pixel amount $W_x$ being 640 points, the horizontal observation angle $FOV_x$ corresponding to the horizontal field-of-view pixel amount $W_x$ is 2.4 degrees, the vertical field-of-view pixel amount $W_y$ being 480 points, the vertical observation angle $FOV_y$ corresponding to the vertical field-of-view pixel amount $W_y$ is 1.8 degrees, when the horizontal correction amount $V_{F\_x}$ is −100 (the number of pixels is 100, in −X axis) and the pitching correction amount $V_{F\_y}$ is 120 (the number of pixels is 120, in +Y axis), the horizontal rotary angle $Ø_x$ is −0.375 degrees and the pitching rotary angle $Ø_y$ is 0.45 degrees according to the equations (3) and (4). The second control command $CM_2$ is a command corresponding to or representing that the horizontal rotary angle $Ø_x$ is −0.375 degrees and the pitching rotary angle $Ø_y$ is 0.45 degrees. The aiming module 130 moves, according to the second control command $CM_2$, to control the aiming point image $M_{AP}$ to lead the tracked-object image $M_{TK}$.

In step S144, as shown in FIG. 2, the dynamic tracking module 120 obtains the elevation correction angle VA according to the distance $D_{TK}$. For example, the dynamic tracking unit 125 obtains the elevation angle correction angle VA corresponding to the distance $D_{TK}$ according to the corresponding relationship between the distance $D_{TK}$ and the elevation correction angle VA. The foregoing corresponding relationship is, for example, a table, such as Table 1 above.

In another embodiment, the corresponding relationship could also be a curve, an equation, etc.

In step S146, as shown in FIG. 2, the control module 150 generates a third control command $CM_3$ (belonging to the control command CM) representing the elevation correction angle VA to the aiming module 130 according to the elevation correction angle VA.

In step S148, as shown in FIGS. 2, 4E1 and 4E2, the aiming module 130 rotates by the elevation correction angle VA according to the third control command $CM_3$. For example, the projection tube 1321 rotates by the elevation correction angle VA around the X axis. In the present embodiment, due to only the aiming module 130 performing an elevation correction action (the observation module 110 does not perform the elevation correction action), the aiming point image $M_{AP}$ does not display elevation angle changes in the observation frame $F_{110}$. After the projection tube 1321 projects the projectile, the projection tube 1321 could return to the position before the elevation angle correction, so that the intersection point of the observation line-of-sight L1 and the projection line-of-sight L2 returns to the aiming point AP before the elevation angle correction.

In step S150, the projection tube 1321 projects a projectile (not shown). Due to the aiming point image $M_{AP}$ being ahead of (leading) the tracked-object image $M_{TK}$, it could compensate the movement of the projectile during the flight time (period) of the tracked-object TK, and thus it could increase the probability of the projectile hitting the tracked-object TK.

To sum up, in the target tracking system and the target tracking method of the disclosed embodiment, the aiming point could be ahead of the tracked-object, so as to compensate the movement (moving amount) of the projectile during the flight time of the tracked-object, and increase the probability of the projectile hitting the tracked-object. In an embodiment, when the target tracking system determines that the tracked-object moves stably, the projection preparation mode is activated to perform compensation for the aiming point, for example, the lag correction vector compensation procedure and the feed-forward correction vector compensation procedure for increasing the probability of the projectile hitting the tracked-object.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A target tracking method, comprising:
   capturing an observation frame by an observation module, wherein the observation frame comprises a tracked-object image of a tracked-object and an aiming point image;
   analyzing the observation frame to obtain a lag correction vector between the aiming point image and the tracked-object image by a dynamic tracking module;
   generating a first control command representing the lag correction vector for an aiming module by a control module;
   the aiming module moving according to the first control command to control the aiming point image to align with the tracked-object image;
   detecting a distance between the observation module and the tracked-object by the observation module;

obtaining a feed-forward correction vector according to the lag correction vector and the distance by the dynamic tracking module;
generating a second control command representing the feed-forward correction vector for the aiming module by the control module; and
the aiming module moving according to the second control command to control the aiming point image to lead the tracked-object image.

2. The target tracking method as claimed in claim 1, further comprising:
obtaining a time according to the distance by the dynamic tracking module; and
obtaining the feed-forward correction vector according to the lag correction vector and the time by the dynamic tracking module.

3. The target tracking method as claimed in claim 2, wherein the time is a projectile flight time.

4. The target tracking method as claimed in claim 2, wherein the feed-forward correction vector is obtained according to the following equations:

$$V_{F\_x} = v_{av\_x} \times \frac{t_{fly}}{\Delta t}; \text{ and} \tag{1}$$

$$V_{F\_y} = v_{av\_y} \times \frac{t_{fly}}{\Delta t}; \tag{2}$$

wherein $V_{F\_x}$ is a horizontal correction amount of the feed-forward correction vector in a horizontal rotary direction, $V_{F\_y}$ is a pitching correction amount of the feed-forward correction vector in an up-and-down pitching direction, $v_{av\_x}$ is a component of the lag correction vector in the horizontal rotary direction, $v_{av\_y}$ is a component of the lag correction vector in the up-and-down pitching direction, $t_{fly}$ is the time and $\Delta t$ is a sampling time.

5. The target tracking method as claimed in claim 1, further comprising:
obtaining an elevation correction angle according to the distance by the dynamic tracking module;
generating a third control command representing the elevation correction angle to the aiming module according to the elevation correction angle by the dynamic tracking module; and
the aiming module rotating by the elevation correction angle according to the third control command.

6. The target tracking method as claimed in claim 5, further comprising:
obtaining the elevation correction angle corresponding to the distance according to a corresponding relationship between the distance and the elevation correction angle by the dynamic tracking module.

7. The target tracking method as claimed in claim 1, further comprising:
in response to a helmet motion, controlling the aiming point image to move.

8. The target tracking method as claimed in claim 1, further comprising:
in response to an eyeball gaze, controlling the aiming point image to move.

9. The target tracking method as claimed in claim 1, further comprising:
outputting one of a search frame and the observation frame to a head-mounted module by the dynamic tracking module; and
in response to a frame switching command, outputting the other of the search frame and the observation frame to the head-mounted module by the dynamic tracking module.

10. The target tracking method as claimed in claim 1, further comprising:
determining whether the tracked-object image performs a steady motion; and
activating an automatic tracking mode by the dynamic tracking module when the tracked-object image performs the steady motion.

11. The target tracking method as claimed in claim 1, further comprising:
outputting a search frame to a head-mounted module by the dynamic tracking module, wherein the search frame comprises a target object image;
capturing an eyeball image of an eyeball by the head-mounted module;
analyzing the eyeball image to obtain an eyeball gaze of the eyeball by the head-mounted module; and
in response to the eyeball gaze being aligned with the target object image in the search frame, setting the target object image as the tracked-object image by the dynamic tracking module.

12. A target tracking system comprising:
an observation module configured to:
capture an observation frame, wherein the observation frame comprises a tracked-object image of a tracked-object and an aiming point image; and
detect a distance between the observation module and the tracked-object;
a dynamic tracking module configured to:
analyze the observation frame to obtain a lag correction vector between the aiming point image and the tracked-object image; and
obtain a feed-forward correction vector according to the lag correction vector and the distance;
a control module configured to:
generate a first control command representing the lag correction vector; and
generate a second control command representing the feed-forward correction vector;
an aiming module configured to:
move according to the first control command to control the aiming point image to align with the tracked-object image; and
move according to the second control command to control the aiming point image to lead the tracked-object image.

13. The target tracking system as claimed in claim 12, wherein the dynamic tracking module is further configured to:
obtain a time according to the distance; and
obtain the feed-forward correction vector according to the lag correction vector and the time.

14. The target tracking system as claimed in claim 13, wherein the time is a projectile flight time.

15. The target tracking system as claimed in claim 13, wherein the dynamic tracking module is further configured to obtain the feed-forward correction vector according to the following equations;

$$V_{F\_x} = v_{av\_x} \times \frac{t_{fly}}{\Delta t}; \text{ and} \tag{1}$$

-continued $$V_{F\_y} = v_{av\_y} \times \frac{t_{fly}}{\Delta t}; \quad (2)$$

wherein $V_{F\_x}$ is a horizontal correction amount of the feed-forward correction vector in a horizontal rotary direction, $V_{F\_y}$ is a pitching correction amount of the feed-forward correction vector in an up-and-down pitching direction, $v_{av\_x}$ is a component of the lag correction vector in the horizontal rotary direction, $v_{av\_y}$ is a component of the lag correction vector in the up-and-down pitching direction, $t_{fly}$ is the time and $\Delta t$ is a sampling time.

16. The target tracking system as claimed in claim 12, wherein the dynamic tracking module is further configured to:
 obtain an elevation correction angle according to the distance; and
 generate a third control command representing the elevation correction angle to the aiming module according to the elevation correction angle;
 wherein the aiming module is further configured to:
  rotate by the elevation correction angle according to the third control command.

17. The target tracking system as claimed in claim 16, wherein the dynamic tracking module is further configured to:
 obtain the elevation correction angle corresponding to the distance according to a corresponding relationship between the distance and the elevation correction angle.

18. The target tracking system as claimed in claim 12, wherein the aiming module is further configured to:
 in response to a helmet motion, control the aiming point image to move.

19. The target tracking system as claimed in claim 12, wherein the aiming module is further configured to:
 in response to an eyeball gaze, control the aiming point image to move.

20. The target tracking system as claimed in claim 12, wherein the dynamic tracking module is further configured to:
 output one of a search frame and the observation frame to a head-mounted module; and
 in response to a frame switching command, output the other of the search frame and the observation frame to the head-mounted module.

21. The target tracking system as claimed in claim 12, wherein the dynamic tracking module is further configured to:
 determine whether the tracked-object image performs a steady motion; and
 when the tracked-object image performs the steady motion, activate an automatic tracking mode.

22. The target tracking system as claimed in claim 12, wherein the dynamic tracking module is further configured to:
 output a search frame to a head-mounted module, wherein the search frame comprises a target object image;
 wherein the head-mounted module is configured to:
  capture an eyeball image of an eyeball; and
  analyze the eyeball image to obtain an eyeball gaze of the eyeball;
 wherein the dynamic tracking module is configured to:
  in response to the eyeball being aligned with the target object image in the search frame, set the target object image as the tracked-object image.

* * * * *